(12) United States Patent
Sigman et al.

(10) Patent No.: US 6,645,908 B1
(45) Date of Patent: Nov. 11, 2003

(54) SOL-GEL DERIVED SORBENTS

(75) Inventors: Michael E. Sigman, Knoxville, TN (US); Amy B. Dindal, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 358 days.

(21) Appl. No.: 09/685,223

(22) Filed: Oct. 10, 2000

Related U.S. Application Data (63) Continuation-in-part of application No. 08/723,794, filed on Sep. 30, 1996, now abandoned.

(51) Int. Cl.$^7$ ................................................. B01J 20/02
(52) U.S. Cl. ...................... 502/405; 502/407; 502/408; 502/172
(58) Field of Search ................................. 502/401, 402, 502/405, 407, 408, 172, 158

(56) References Cited

U.S. PATENT DOCUMENTS

| | | | | |
|---|---|---|---|---|
| 4,377,507 A | * | 3/1983 | Pope et al. ..................... | 588/11 |
| 4,382,070 A | | 5/1983 | Novak et al. | |
| 4,886,769 A | | 12/1989 | Kuma et al. | |
| 5,021,091 A | * | 6/1991 | Takarada et al. ........ | 106/287.16 |
| 5,637,135 A | * | 6/1997 | Ottenstein et al. ............ | 96/101 |
| 5,709,715 A | | 1/1998 | Guidotti et al. | |
| 5,712,402 A | * | 1/1998 | Pinnavaia et al. .......... | 552/309 |
| 5,914,120 A | * | 6/1999 | Wellinghoff et al. ........ | 424/406 |
| 6,124,410 A | * | 9/2000 | Ito et al. ........................ | 526/77 |
| 6,200,680 B1 | * | 3/2001 | Takeda et al. ............... | 428/402 |

FOREIGN PATENT DOCUMENTS

| | | | | |
|---|---|---|---|---|
| WO | WO 9533688 A1 | * | 12/1995 | ............ C01G/9/02 |

OTHER PUBLICATIONS

"Efficiently Monitor Toxic Airborne Compounds by Thermal Desorption", Supelco Separation Technologies, GC Bulletin 849B, 1988, pp. 1–4, no month.

"Bulk Adsorbents," Supelco Catalog 1994, p. 381, no month.

C. Morterra and M.J.D. Low ""Reactive Silica. I. The Formation of a Reactive Silica by the Thermal Collapse of the Methoxy Groups of Methylated Aerosil,","" J. of Phys. Chem.,, vol. 73 ( No. 2), p. 321–326, (Feb. 16, 1969).

E. Borello, et al,, ""Infrared Study of Methanol Adsorption on Aerosil. I. Chemisorption at Room Temperature,","" J. of Phys. Chem.,, vol. 71 ( No. 9), p. 2938–2944, (Aug. 16, 1967).

E. Borello, et al,, ""Infrared Study of Methanol Adsorption on Aerosil. II. Physical Adsorption at Room Temperature,","" J. of Phys. Chem.,, vol. 71 (No. 9), p. 2945–2951, (Aug. 16, 1967).

S. Sakka, et al,, ""Organometallic–Derived Ceramics,","" Ceramics Int.,, p. 217–225, (Jan. 16, 1991).

G. D. Pethybridge, et al,, ""Aerogels,","" Novel Synthesis & Processing of Ceramics, British Ceramic Proceedings, No. 53, p. 73–86, (Jan. 16, 1994).

Y. A. Attia,, ""Capture of Greenhouse Gases by Novel Aerogel Sorbents Prepared by Sol–Gel Technology,","" Processing and Utilization of High Sulfur Coals V, p. 467–484, (Jan. 16, 1993).

U. Schubert, et al, , ""Inorganic–Organic Hybrid Aerogels,","" Mat. Res. Soc. Symp. Proc.,, p. 151–162, (Jan. 16, 1994).

Adsorbent Resins, SIS, Feb. 2, 1997, p. 1–11.

A. M. Buckley, et al,, ""The Sol–Gel Preparation of Silica Gels,","" J. of Chem. Education,, vol. 71 (No. 7), p. 599–602, (Jan. 16, 1994).

H. Willard, et al,, , Instrumental Methods of Analysis, 6th ed., Wadsworth Publishing Company (Belmont, CA), p. 609–610, no date.

B. I. Tul'Bovich, et al,, "Database CAPLUS Abs. #1971:91559, "Gas–Chromatographic Determination of Isotherms and Heats of Adsorption of Benzene, Toluene , Perfluorobenzene, and Perfluorotoluene in Aerosil and Methylated Aerosil,","" Zh. Fiz. Khim., vol. 44 (No. 12), p. 3145–8, (Jan. 16, 1970).

D. Wang, et al,, "Sol–Gel Column Technology for Single–Step Deactivation, Coating, and Stationary–Phase Immobilzation in High–Resolution Capillary Gas Chromatography," Anal. Chem., vol. 69 (Nov. 22), p. 4566–4576, (Nov. 15, 1997).

* cited by examiner

*Primary Examiner*—Stanley S. Silverman
*Assistant Examiner*—Edward M. Johnson
(74) *Attorney, Agent, or Firm*—Shelley L. Stafford (57) ABSTRACT

Described is a method for producing copolymerized sol-gel derived sorbent particles for the production of copolymerized sol-gel derived sorbent material. The method for producing copolymerized sol-gel derived sorbent particles comprises adding a basic solution to an aqueous metal alkoxide mixture for a pH$\leq$8 to hydrolyze the metal alkoxides. Then, allowing the mixture to react at room temperature for a precalculated period of time for the mixture to undergo an increased in viscosity to obtain a desired pore size and surface area. The copolymerized mixture is then added to an immiscible, nonpolar solvent that has been heated to a sufficient temperature wherein the copolymerized mixture forms a solid upon the addition. The solid is recovered from the mixture, and is ready for use in an active sampling trap or activated for use in a passive sampling trap.

7 Claims, 10 Drawing Sheets

SOL-GEL DERIVED SORBENTS

CROSS-RELATED APPLICATIONS

The present invention is a Continuation-in-Part application to the parent application, U.S. application Ser. No. 08/723,794 filed Sep. 30, 1996 abandon.

This invention was made with Government support under contract DE-AC05-96OR22464 awarded by the U.S. Department of Energy to Lockheed Martin Energy Research Corporation, and the Government has certain rights in this invention.

FIELD OF THE INVENTION

The present invention relates to sorbents used for the analysis of organic contaminants, particularly to sol-gel derived sorbents and more particularly to copolymerized sol-gel derived sorbents with controlled pore sizes and surface areas used as air-sampling sorbents for the analysis of organic contaminants including organic explosives.

BACKGROUND OF THE INVENTION

Until recently, the needs for improved solid sorbent sampling media have been largely unrecognized. Dramatic improvements in sensor and analytical instrument sensitivity have relegated interest in improved sampling materials to secondary status. However, existing regulatory drivers and/or remediation/containment monitoring requirements are forcing the environmental analytical chemist to detect analytes at lower levels where instrumental sensitivity improvements are more difficult to achieve. Sample concentration, prior to sensing or analytical detection, will be required to achieve the more sensitive detection limits.

Solid sorbents have been used for a number of years for sampling of environmental contaminants. The use of small, robust multisorbent traps already has found application in mainstream analytical methodologies and exhibited the potential for substantial cost savings. For example, described in the *Compendium of Methods for the Determination of Toxic Organic Compounds in Ambient Air* are U.S. Environmental Protection Agency methods for monitoring volatile and semivolatile organic compounds in air samples, several of which employ sorbent sampling techniques. In fact, each of the first two methods calls for a different sorbent sampling technique, followed by thermal desorption to a capillary gas chromatograph column for analysis. In Method TO-1, compounds are trapped on TENAX™ (poly (2,6-diphenyl)-phenylene oxide, Enka Research Institute Arnhem), a porous polymer adsorbent, transferred to a cold trap, and desorbed to the column. In Method TO-2, compounds are trapped on a carbon molecular sieve adsorbent, transferred to a cold trap, and desorbed to the column.

Various materials have been developed over the years for use as sorbents for capturing and releasing organic analytes. Activated charcoal was one of the first widely used solid sorbent materials. However, its properties are such that, for many analytes, it does not release the sorbate under a solvent wash, and can often promote chemical transformation of the sorbed analytes. Today, activated charcoal is typically used for industrial hygiene applications, where the stability of the analyte in question has been confirmed, and quantities of the target analyte are not small. Porous polymers, such as the CHROMOSORB 106™ (styrene/divinylbenzene copolymer, Manville Corporation) and TENAX-GC™, increased in popularity because they could be thermally desorbed and reused. However, TENAX-GC™, the most widely used of these sorbents, suffers of poor retention of polar molecules and more volatile species. More importantly, TENAX™ can decompose, slightly, when it is heated, resulting in a number of artifacts being observed in supposed blank samples.

In the late 1980's, nonspecific carbon-based sorbents, based on sintered carbon blacks and carbon molecular sieves, became commercially available. These materials have excellent thermal stability, and because of their non-specific adsorption characteristics, are useful for collection of several types of organic volatiles or semivolatiles. Carbon sorbents are also known to have "good" thermal stability and are good sorbents for a wide range of organics such as hydrocarbons, chlorinated solvents, nitriles, ketones, etc. However, the carbon-based solid sorbents utilized in currently used systems suffer from some important limitations. The volatility range of analytes which any one sorbent can collect is relatively narrow, necessitating the use of traps filled with the multiple sorbents described above in a "parfait" configuration. That is, the sorbents are packed sequentially in a bed, with increasingly retentive sorbents downstream. The traps can be thermally desorbed, during which time the desorption flow is the reverse of that used for sampling. While these so-called "multi-sorbent traps" are extremely useful in a variety of active air sampling applications, the multilayer configuration of the traps precludes their use for passive sampling. Also, if the thermal pulse during the desorption phase of the analysis is not closely synchronized with the desorption flow, sorbates can be pushed off one sorbent bed and be irreversibly sorbed on a more retentive sorbent bed.

The silicate sol-gel technique is a process whereby a tetraalkylorthosilicate such as tetramethylorthosilicate (TMOS), is hydrolyzed under acid or base catalysis to first produce a sol which subsequently gels and proceeds to form a xerogel. The sol is a colloidal suspension of small (1 nm to 1000 nm diameter) particles of polymerized silicate. The suspension is thermodynamically stable and upon further reaction proceeds to produce a gel. The gel is a solid structure formed from the reacting silicate and containing within it a continuous liquid phase. Further curing of the gel by removal of all trapped water leads to the formation of a xerogel. The low processing temperatures used to form these glasses allow for construction of inorganic materials with entrapped organic guests. The sol-gel process is typically used to produce highly hydroxylated materials.

Materials for use as organic analyte sorbents must contain covalently bonded nonpolar moieties to promote favorable analyte-substrate interactions. Several methods have been developed that allow for the production of composite inorganic-organic materials. Alkyltrialkoxysilanes, such as methyltrimethoxysilane (MTMS), can be polymerized to form xerogels wherein an alkyl substituent is attached directly to silicon (Si) atoms in the backbone of the polymer network. These materials have organic moieties throughout and are substantially different from surface derivatized materials. Another approach to preparing composite inorganic-organic materials involves derivatization of the surface of inorganic oxides with a variety of organic reagents. This approach has been widely employed to modify the surface of chromatographic silica gels, for example. A variety of technologies for preparation of siloxane, $[SiO_2]$—O—Si—R, bonded materials exists. These methods often produce materials having varied thermal and hydrolytic instabilities. One reason for their instability is that methods based on derivatizing surface hydroxyl groups of silica-based gels are not able to cap all hydroxyl groups as a result of the bulky size of the derivatizing agents. Underivatized and exposed surface hydroxyl groups contribute to the thermal and hydrolytic instability of many supports.

An approach that has been used to circumvent this problem involves the use of trifunctional silanes such as $RSiCl_3$ and $RSi(OR')_3$ as surface modifying reagents. It has been reported in *Analytical Chemistry*, v. 65 (1993), pp. 822–826, that trichlorosilanes can be induced to undergo attachment with simultaneous lateral polymerization to form a siloxane coating, when the reaction is conducted on a silica gel that contains a monolayer of water on its surface. Although not studied in detail, the polymeric bonded phases were reported to have substantially improved hydrolytic stabilities even at pH 1.8 and 10.0. This research was aimed at making high carbon density surfaces with mixed $C_3$ and $C_{18}$ coatings for chromatography purposes. However, the procedure is general for other "R" groups.

Another intriguing approach stems from a recent report in *Journal of American Chemical Society*, vol. 117, pp. 2112–2113 on the reactions of ethoxysilanes with silica gels. Highly dehydroxylated silica gels were prepared by heating at 600° C. Reaction of this material with a monoethoxysilane reagent gave a highly derivatized surface, as determined by solid-state NMR, that quantitatively retained the ethoxy groups. This finding was interpreted as involving reaction with surface siloxane groups, generated by the heat treatment, as shown below.

$(CH_3)_3SiOCH_2CH_3+[SiO_2]O[SiO_2] \rightarrow (CH_3)_3SiO[SiO_2]+CH_3CH_2O[SiO_2]$ The key feature is that as the siloxane bridges are opened, each trimethylsilyl group added has an adjacent ethoxy group.

Methyl-capped inorganic oxides can be produced by treating a hydroxylated material with methanol. Silica gels produced by this technique are thermally stable up to 600° C. to 650° C. before methyl moieties are lost as described by C. Morterra et al., *J. Phys. Chem.*, v. 73 (1969), pp. 321–326. The use of alkyl-capped inorganic oxides in aqueous systems is severely limited by rapid hydrolysis to give methanol and the hydroxylated inorganic oxide.

Explosives vapor sampling is an important part of operational protocols for bomb scene investigations. Vapors containing explosives can be generated by gently heating debris in a closed container and collecting the headspace onto an adsorbent. Volatile explosives can also be collected on adsorbent tubes from the rubble and debris at a bomb scene. Sorbents that have reportedly been used to collect explosives vapors include activated charcoal, Tenax™, Tenax-GC™, Porapak Q™, Thermosorb/N™, Amberlite XAD-7™, and silica. The most commonly reported method for removing the explosives from the sorbent bed is by washing with organic solvents. Solvents that have been used to remove explosives from various adsorbent beds include methylene chloride, acetone, 2-propanol, ethyl acetate, methyl tertiary-butyl ether, methylene chloride/methanol mixture, pentane, and pentane/methyl tertiary-butyl ether mixture.

Thermal desorption of organic explosives from adsorbent traps containing Tenax-GC™, Tenax™, and from a concentric tube adsorption device has also been reported. Hobbs and Conde in "Comparison of different techniques for the headspace analysis of explosives", *Proc. 3rd Int. Symp. on Analysis and Detection of Explosives*, have shown that thermal desorption from Tenax™ was unsatisfactory using a commercial desorption unit that focused the analytes on a Tenax™ bed. A second thermal desorption method, the "Tenax™ needle" method, was also tested. The Tenax™ needle method involved passing the explosives through a standard injection port following thermal desorption from a Tenax™ sorption tube. This method allowed chromatographic analysis of the headspace above commercial explosives. Detection limits were not reported for the Tenax™ needle method. The use of solid-phase microextraction has also been reported for the collection and analysis of organic explosives by headspace sampling, and for sampling explosives and their metabolites in seawater.

OBJECTS OF THE INVENTION

Accordingly, it is an object of the present invention to provide sol-gel derived sorbents and copolymerized sol-gel derived sorbents that are capable of efficiently binding organic materials.

It is another object of the present invention to provide a method for producing copolymerized sol-gel derived sorbents having controlled pore size and surface areas, thermal stability and purity of the material that capable of efficiently binding organic materials.

It is yet another object of the present invention to provide a method for using copolymerized sol-gel derived sorbents for the analysis of organic contaminants including the analysis of organic explosives.

It is a further object of the present invention to provide sol-gel derived sorbents including copolymerized sol-gel derived sorbents that are thermally stable.

It is still yet another object of the present invention to provide sol-gel derived sorbents including copolymerized sol-gel derived sorbents that are highly pure materials.

Further and other objects of the present invention will become apparent from the description contained herein.

SUMMARY

In accordance with one aspect of the present invention, the foregoing and other objects are achieved by a method for producing copolymerized sol-gel derived sorbent particles for the production of copolymerized sol-gel derived sorbent material with controlled pore size and surface area used as air-sampling sorbents for the analysis of organic contaminants and for the analysis of organic explosives. The copolymerized sol-gel derived sorbent particles have thermal stability and high purity. The method for producing copolymerized sol-gel derived sorbent particles comprise adding a sufficient amount of a basic solution to an aqueous metal alkoxide mixture which comprises at least two different metal alkoxides, to hydrolyze the metal alkoxides wherein the mixture has a pH$\leq$8. Then, allowing the mixture to react at room temperature for a desired, precalculated period of time for the mixture to undergo a desired increase in viscosity so to obtain a desired pore size and surface area. Then, adding the copolymerized mixture to a nonmiscible, nonpolar solvent that has been heated to a sufficient temperature wherein the copolymerized mixture forms a solid upon addition to the heated nonpolar solvent. Then, recovering the solid from the copolymerized-nonpolar solvent mixture.

In accordance with another aspect of the present invention, other objects are achieved by a method for using copolymerized sol-gel derived sorbent particles wherein the method comprises providing an active sampling trap containing copolymerized sol-gel derived sorbent particles wherein the copolymerized sol-gel derived sorbent particles comprise copolymerized metal alkoxides forming nonpolar sorbent particles. Then, exposing the active sampling trap to a sample containing organic analytes at a rate sufficient enough to permit the organic analytes to contact and adsorb onto the copolymerized sol-gel derived sorbent particles.

Still further objects are achieved by a method for using copolymerized sol-gel derived sorbent particles wherein the method comprises providing a passive sampling trap containing copolymerized sol-gel derived sorbent particles wherein the copolymerized sol-gel derived sorbent particles comprise copolymerized metal alkoxides forming nonpolar sorbent particles. Then, exposing the passive sampling trap to a sample containing organic analytes for a period of time sufficient enough to permit the organic analytes to contact and adsorb onto the copolymerized sol-gel derived sorbent particles.

DETAILED DESCRIPTION OF THE INVENTION

The present invention is one in which composite inorganic-organic materials, prepared by a sol-gel process to produce sol-gel derived sorbents, are designed with nonpolar moieties which are capable of efficiently binding organic materials. Sol-gels are thermally stable to high temperatures and therefore provide a suitable substrate for thermal desorption and analysis of a wide range of organics. One embodiment of the present invention is a sol-gel material with or without surface treatment by chemical modification, such as methylation. The material of the present invention provides a useful sampling medium. The sorbent is unusually unique because of the material's high surface area, narrow pore size distribution, thermal stability and purity. Another embodiment of the present invention is a particular sol-gel (SG) derived material, a copolymerized SG material which is highly useful as an air-sampling sorbent for volatile organics including explosives, depending on the pore structure and surface area. Applicant's present invention also includes a method for producing the copolymerized SG material wherein the method controls the pore size and surface area by a hot solvent processing sol-gel method.

The sol-gel acts as a sorbent material capable of sampling, retaining, concentrating, and releasing organics ranging from highly volatile to semivolatile species. The present invention is valuable because it is a single material that can replace multi-bed sorbent traps in active sampling systems, or can function as a passive sampler where multi-bed sorbent traps cannot. The methylated sol-gel sorbent and the copolymerized sol-gel sorbent of the present invention also tolerates much higher operating temperatures than conventional carbon-based traps, up to about 600° C., thereby permitting desorption of less volatile organics. Other chemically modified sol-gel materials containing organic moieties directly attached to silicon exhibit thermal stabilities up to about 325° C. The sol-gel sorbent material made by the polymerization method of EXAMPLE 2 of the present invention has a high surface area, typically 800–950 $m^2/g$ ($N_2$-BET), up to about 1100 $m^2/g$, 10–20 Å average pore radius.

The present invention includes a method for producing sol-gel sorbents by polymerizing metal alkoxide molecules $M(OR)_n$ by base catalysis (see EXAMPLE 2), where M is a metal atom such as Si, Ti, Zr, Na or Ba, R is an alkyl or aryl group such as $CH_3$, $C_2H_5$, $C_3H_7$, $C_4H_9$, $C_6H_5$, etc., and n is the oxidation state of the metal. For example, an aqueous alcoholic mixture of tetraalkylorthosilicate, typically tetramethylorthosilicate or tetraethylorthosilicate, is polymerized by base catalysis with rapid stirring in warm nonmiscible, nonpolar solvent, such as benzene or cyclohexane, to produce a high surface area and a uniform solid. The resulting material having a polar surface is then dried and ready for use as a sorbent. Alternatively, the material may further undergo surface treatment in which the surface hydroxyls are alkylated by refluxing in alcohol such as methanol, ethanol, 2-propanol, etc, or in the case of methylation, by reacting the surface hydroxyls with diazomethane. The nonpolar derivatized material is partially conditioned by heating under vacuum at about 300° C., 5 μm Hg for approximately 24 hours. The modification of the surface hydroxyls by alkylation produce sorbent materials with nonpolar surfaces.

Surface hydroxyls on the material may be partially alkylated by refluxing the sample in an alcohol such as methanol, ethanol, 2-propanol, etc. for three hours. The material is placed in a round bottom flask charged with the alcohol (approximately three times the volume of the solid) and heated to reflux. After one hour, the reflux is stopped and the alcohol is changed by decanting and replacing with fresh solvent. After three cycles, the alcohol is decanted off the sample and the sample is subsequently dried under vacuum.

The sol-gel material may be methylated by reaction of surface hydroxyls with diazomethane ($CH_2N_2$) in diethyl ether. The solution of diazomethane in ether is prepared by addition of DIAZALD™ (Aldrich Chemical Co., N-methyl-N-nitroso-p-toluene-sulfonamide), typically 2 g to about 20 ml of diethyl ether in a side-arm flask containing ethanol (4 ml) and about 3 ml of 5 normal aqueous sodium hydroxide. The side-arm flask is stoppered with cork and heated gently with warm tap water. The diazomethane is distilled with the diethyl ether, condensed into a receiving flask and subsequently added to the sol-gel sample. The sample is allowed to sit until all of the yellow color associated with the presence of diazomethane has dissipated, indicating that the reaction is complete.

The surface of the material may also be chemically modified by reaction with an organometalhalide $R'_zM(X)_{n-z}$ or organohalide R'X, where M is a metal atom such as silicon, titanium, zirconium or barium, and R' is an organic moiety such as $CH_3$, $C_2H_5$, $C_6H_5$, etc., X is a halide or an alkoxide and n is the oxidation state of the metal. For example, the sol-gel material (2 g) is heated to 100° C. for 24 hours and cooled to room temperature in a desiccator charged with dry magnesium sulfate. The sol-gel material is then placed in a pear-shaped 50 ml flask and 30 ml of dry tetrahydrofuran (THF) is added. The flask is stoppered with a septum and placed under an atmosphere of argon gas. The surface derivatizing reagent (such as chlorodimethylphenylsilane, 2 g) is added by syringe through the septum and the mixture is allowed to react overnight. The surface modified material is isolated by filtration, washed with additional THF, followed by oven drying at 100° C.

Another embodiment for producing copolymerized sol-gel sorbents is one in which metal alkoxide molecules $M(OR)_n$ and $R'_zM(OR)_{n-z}$ are copolymerized by base catalysis (see EXAMPLE 1), where M is a metal atom such as Si, Ti, Zr or Ba, R and R' are alkyl and aryl groups such as $CH_3$, $C_2H_5$, $C_3H_7$, $C_4H_9$, $C_6H_5$, etc., and n is the oxidation state of the metal. These materials have organic moieties throughout and are substantially different from surface derivatized materials. An example is one in which an aqueous alcoholic tetraalkylorthosilicate and alkyltrialkoxysilane mixture, typically tetramethylorthosilicate (TMOS) and methyltrimethoxysilane (MTMS), are mixed in a given ratio to give a homogeneous solution, such as one weight part tetraalkylorthosilicate to three weight parts alkyltrialkoxysilane, and then copolymerized by base catalysis as described above. The resulting sorbent has a less polar surface than those polar sorbents formed by polymerization of $M(OR)_n$ alone. The copolymerized material is ready for use as a sorbent after activation to remove any thermally-labile residue. Activation of the copolymerized sol-gel sorbent material is achieved by heating the copolymerized solid formed up to 550° C. (<600° C.) under the flow of an inert gas such as Argon. The utility of the copolymerized sol-gel sorbent material as an air-sampling sorbent for volatile organics including explosives depends on the pore structure and surface area. The pore size distribution and the surface area can be controlled by the described hot-solvent processing step, see EXAMPLE 1.

EXAMPLE 1

TMOS (Aldrich, Lot #2829AU) and MTMS (Aldrich, Lot #05026TO) were mixed in a 1 to 3 weight ratio. An amount of methanol (J T Baker Lot J31262) was added to the TMOS-MTMS mixture which is equivalent in weight to sum of the TMOS and MTMS weights. An amount of water (B&J Lot #BJ309) was added to the mixture which was equal to 60% of the methanol weight. Ammonium hydroxide solution ($NH_4OH(aq)$, pH=11), (ammonium hydroxide solution was prepared with deionized water, using 30% ammonium hydroxide (Baker Lot #D15053)) was added dropwise to the mixture such that the pH of the mixture following addition did not exceed 8. A small fraction of the mixture was withdrawn and set aside to allow calculation of the gel-time. The gel-time ($t_g$) is defined as the time required for the mixture to reach the gel point after addition of the $NH_4OH$ catalyst. The remainder of the mixture was allowed to proceed for a given period of time (t) and then added to hot (about 60° C. to about 80° C.) cyclohexane (J T Baker Lot #H08608) with stirring. The resulting solid was collected by filtration and air-dried. The sample was heated to 350–550° C. (<600° C.) under a flow of inert gas (Ar) for a period of several hours for activation to remove thermally-labile residue. The resulting powder was ready for use as an air-sampling sorbent.

Figure 1:
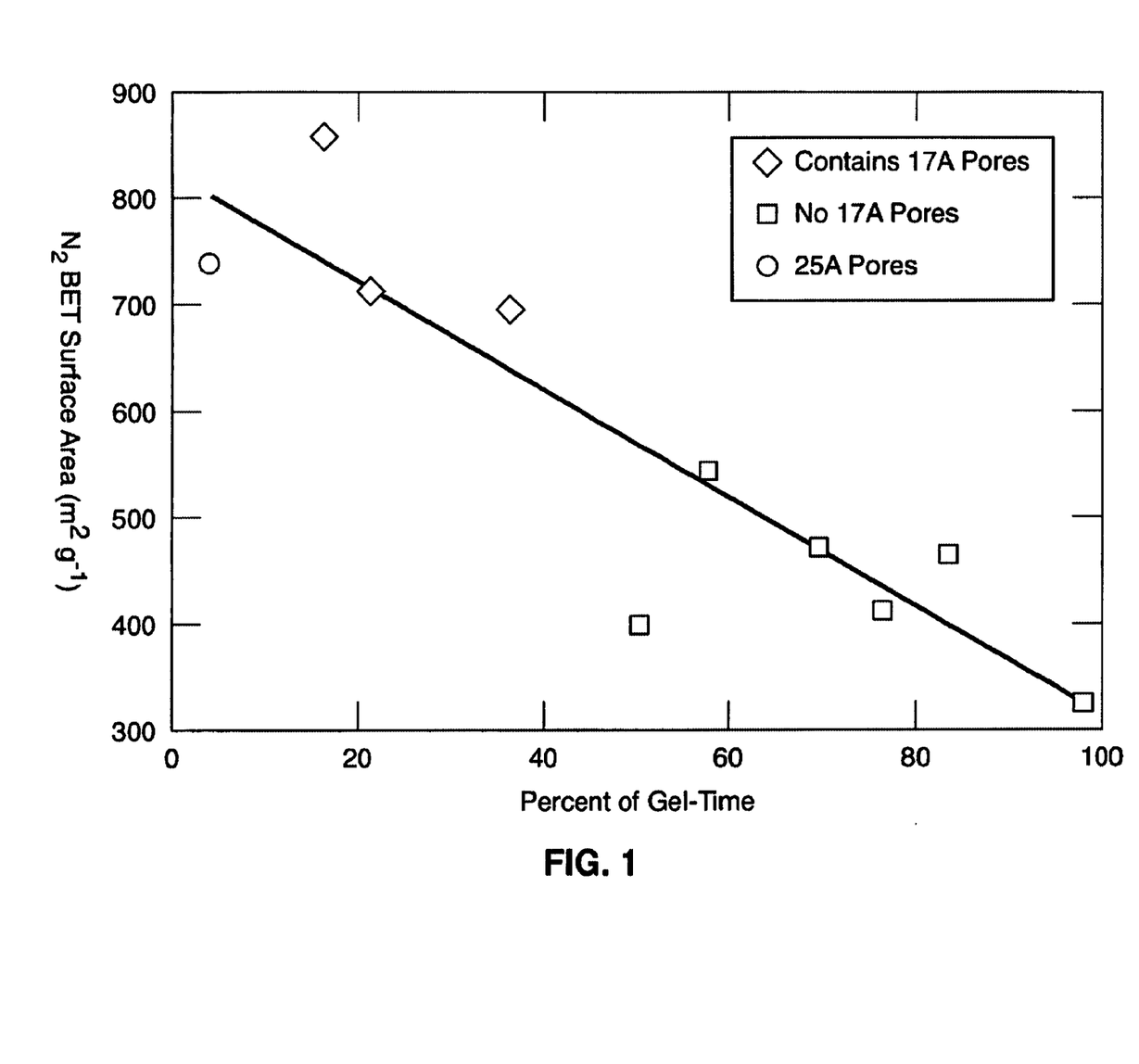
FIG. 1 shows $N_2$-BET surface area measurement results, $N_2$-BET surface area versus percent of gel-time for the co-polymerized sol-gel (SG) derived sorbent.

The material prepared in EXAMPLE 1 was further characterized by $N_2$-BET (Brunauer, Emmett, and Teller) surface area measurements and DRIFT (infra-red) spectroscopy. $N_2$-BET results are depicted in FIG. 1. The data show that surface area for the powders produced by the described procedure decreases as the percent of gel-time (defined as $t/t_g \times 100$) increases. A linear model (slope=–5.12, intercept=830, n=10, r=0.896), shown in FIG. 1, accounts for 80% of the variance in the data. Samples allowed to react greater than or equal to 50% of gel-time contained no 17 Å radius pores. Samples reacted between 16 and 36% of gel-time contained 17 Å radius meso-pores as the defining structural feature. Samples reacted to less than or equal to 20% gel-time also possessed 25 Å radius pores.

Figure 2:
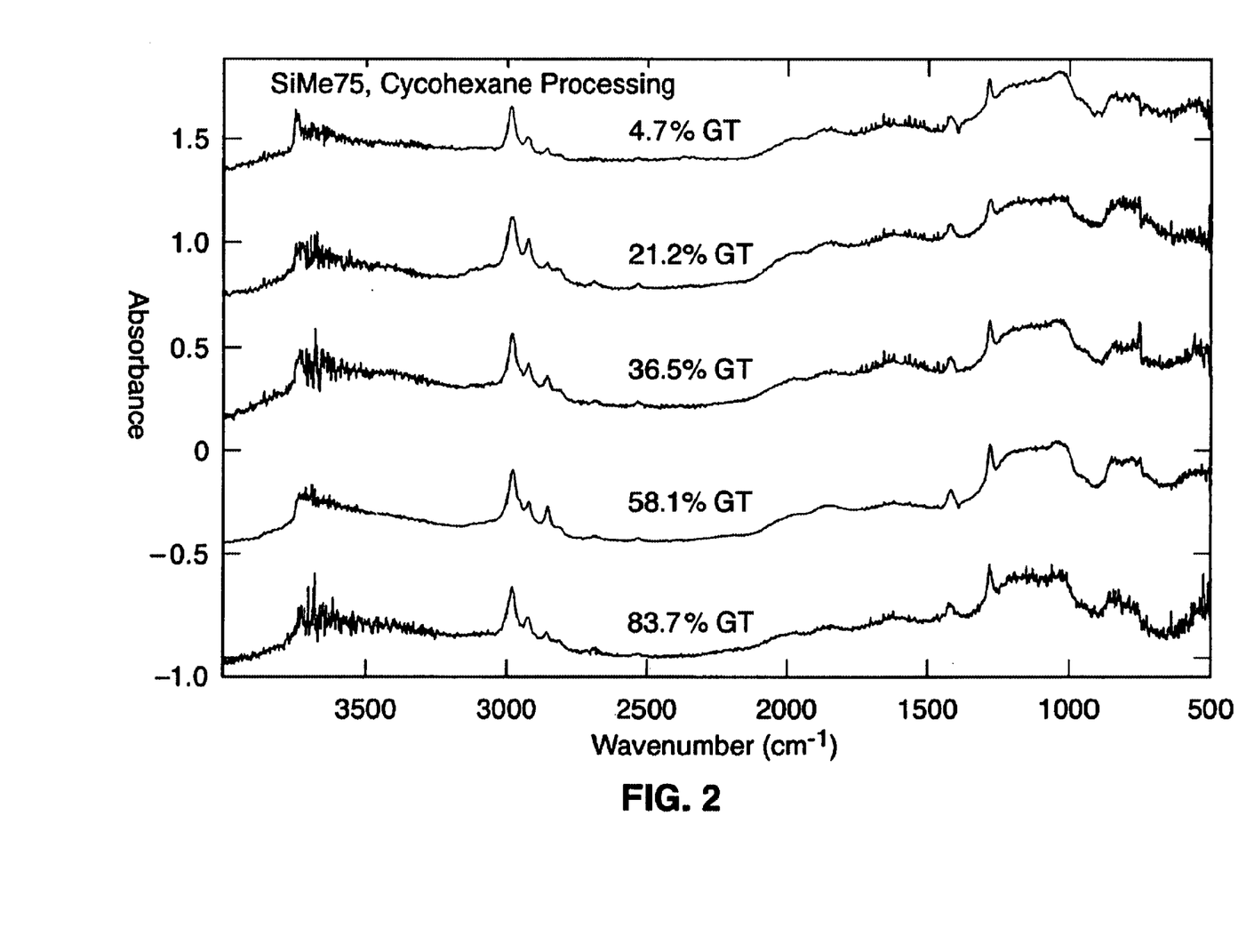
FIG. 2 is the DRIFT spectra showing comparable amounts of methyl incorporation for samples processed in hot cyclohexane at variable percent gel-times.

The DRIFT spectra, FIG. 2, show comparable amounts of methyl incorporation for samples processed in hot cyclohexane at variable percent gel-times. The methyl incorporation is judged on the basis of the C—H stretch at 3000 $cm^{-1}$.

EXAMPLE 2

In a 100 mL beaker, approximately 20 g of tetramethylorthosilicate (TMOS) (Aldrich, Lot #01428PG), was weighed out, then equivalent weight portions of methanol (J T Baker Lot J31262) and water (B&J Lot #BJ309) were added to the beaker.

Then a 250 mL round bottom glass flask with a stir bar was filled with approximately 125 mL of cyclohexane (J T Baker Lot #H08608). The cyclohexane was rapidly stirred and heated in the range of 60° C. to 80° C.

An ammonium hydroxide solution was prepared with deionized water, using 30% ammonium hydroxide (Baker Lot #D15053) to a pH of 11.

Then, approximately 8 drops of the ammonium hydroxide solution (pH 11) was added to the TMOS-methanol-water solution using a standard Pasteur pipette. The mixture was allowed to react at room temperature, stirring occasionally, until a noticeable increase in viscosity had occurred (approximately 7 minutes). At this point, a sol was formed.

The partially reacted mixture of TMOS-methanol-water was added to the rapidly stirred warm cyclohexane at such a rate as to maintain the temperature above 50° C. Addition to the cyclohexane was done through a wire mesh, approximately 1 mm square, to break up any particles. Within 2 minutes of adding the TMOS-methanol-water mixture to the warm cyclohexane, a solid was formed. Reaction was continued for 5 minutes at approximately 60° C. Then, the solid was removed from the cyclohexane by filtration and then air dried at room temperature. The sample was then outgassed at 100° C. under vacuum (5 μm Hg) for a period of 3 hours, followed by $N_2$-BET (Brunauer, Emmett, and Teller) characterization.

Surface hydroxyls on the material were partially methylated by refluxing the sample in methanol for three hours. The material was placed in a round bottom flask having a stir bar, the flask charged with methanol (approximately three times the volume of the solid) and heated to reflux (approximately 60° C.). After one hour, the reflux was stopped and the methanol was changed by decanting off the used methanol and replacing it with fresh solvent. After three cycles, the methanol was decanted off the sample and the sample dried under vacuum in a rotary evaporator at temperatures less than 40° C. The sample was then placed under high vacuum (5 μm Hg) and heated at 300° C. for an additional 24 hours. Further characterization of the material was accomplished by $N_2$-BET and IR spectral measurements. The resulting material has a high surface area, typically 800–950 $m^2/g$ ($N_2$-BET), 10–20 Å average pore radius. Strong C—H stretching absorptions in the IR were exhibited at 2854 $cm^{-1}$ and 2992 $cm^{-1}$. Isolated O—H stretching absorption was observed at 3735 $cm^{-1}$, and hydrogen-bonded O—H stretching absorptions were observed in a broad band from 3700 $cm^{-1}$ to 3100 $cm^{-1}$.

EXAMPLE 3

The sorbent thus prepared from EXAMPLE 2 was packed (approximately 0.22 g) in a stainless steel tube (6 mm Q.D., 4 mm I.D., 76 mm length) and plugged with silane-treated glass wool to form an active sampling trap. The material was further conditioned by heating the trap to about 350° C. under a flow of helium gas (100 ml/min.). Complete removal of residual methanol required conditioning for 140 hours.

Figure 3:
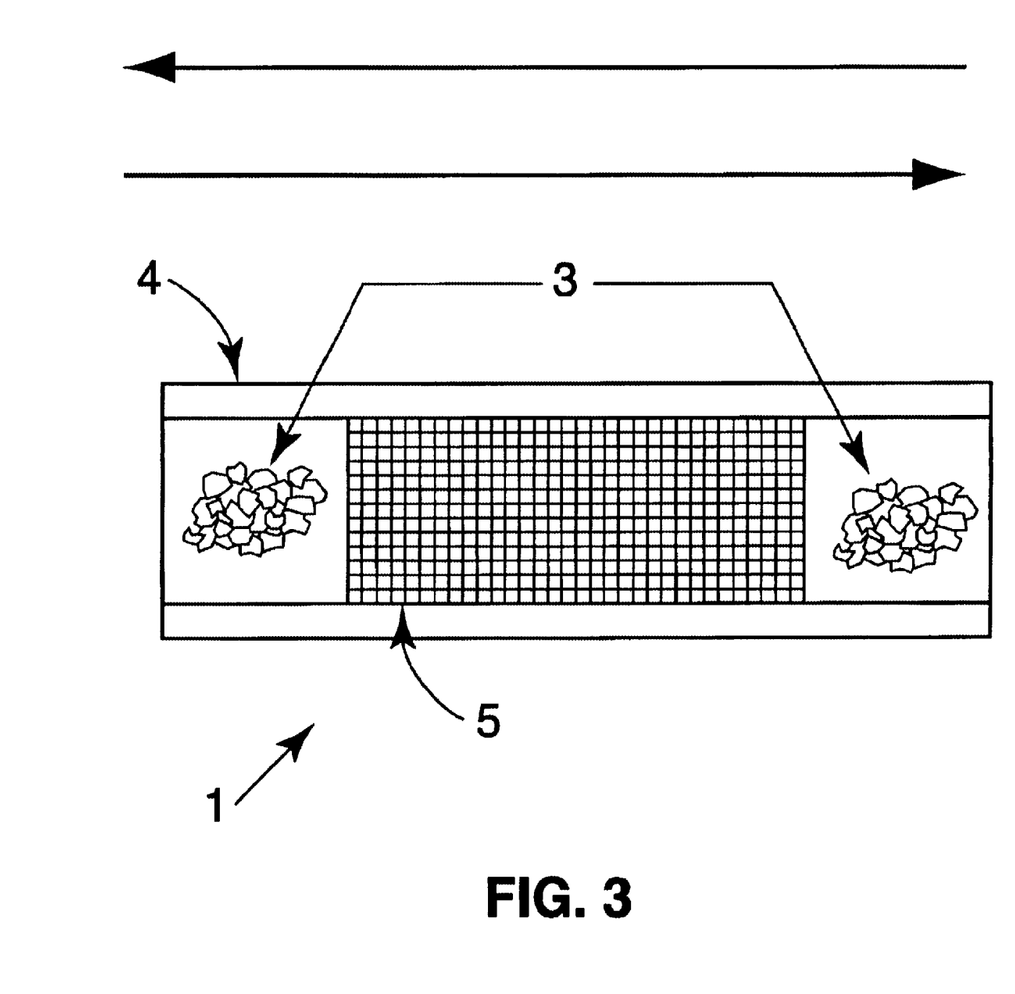
FIG. 3 demonstrates the use of an active sampling trap loaded with sol-gel derived sorbent particles of the present invention.

FIG. 3 demonstrates how organics vapors were sorbed onto the trap by passing a volume of gas containing the analytes through the trap at a rate of 200 ml/min. (The trap may be desorbed immediately for analysis or stored at 4±2° C. for analysis at a later time.) Analytes were thermally desorbed from the trap under a reversed flow of helium gas at 350° C. and focused using a cryogenic loop for subsequent gas chromatographic analysis.

FIG. 3 shows an active sampling trap 1 in which the sol-gel sorbent particles 5 are packed in a stainless steel tube 4 and plugged with silanized glass wool 3. The arrows indicate the opposite directions of sorption and desorption.

The material was successfully tested for retention and release of organics, which include benzene-$d_6$, acetonitrile, acetone, vinylidine chloride, methylene chloride, propane nitrile, butanol, hexane, hexafluorobenzene, benzene, 1-butanol, butane nitrile, 2-pentanone, heptane, ethylbenzene-$d_{10}$, toluene-$d_8$, toluene, pentane nitrile, 2-hexanone, octane, hexane nitrile, 2-heptanone, nonane, bromobenzene-$d_5$, heptane nitrile, 2-octanone, dodecane-d26, decane, undecane, dodecane, tridecane, Method TO14 analyte mix (see USEPA *Compendium of Methods for the Determination of Toxic Organic Compounds in Ambient Air,*) 2,4,6-trinitrotoluene, dinitrotoluene (all isomers thereof), diisopropyl methyl phosphonate, dimethyl methyl phosphonate, and tributyl phosphate.

Figure 4:
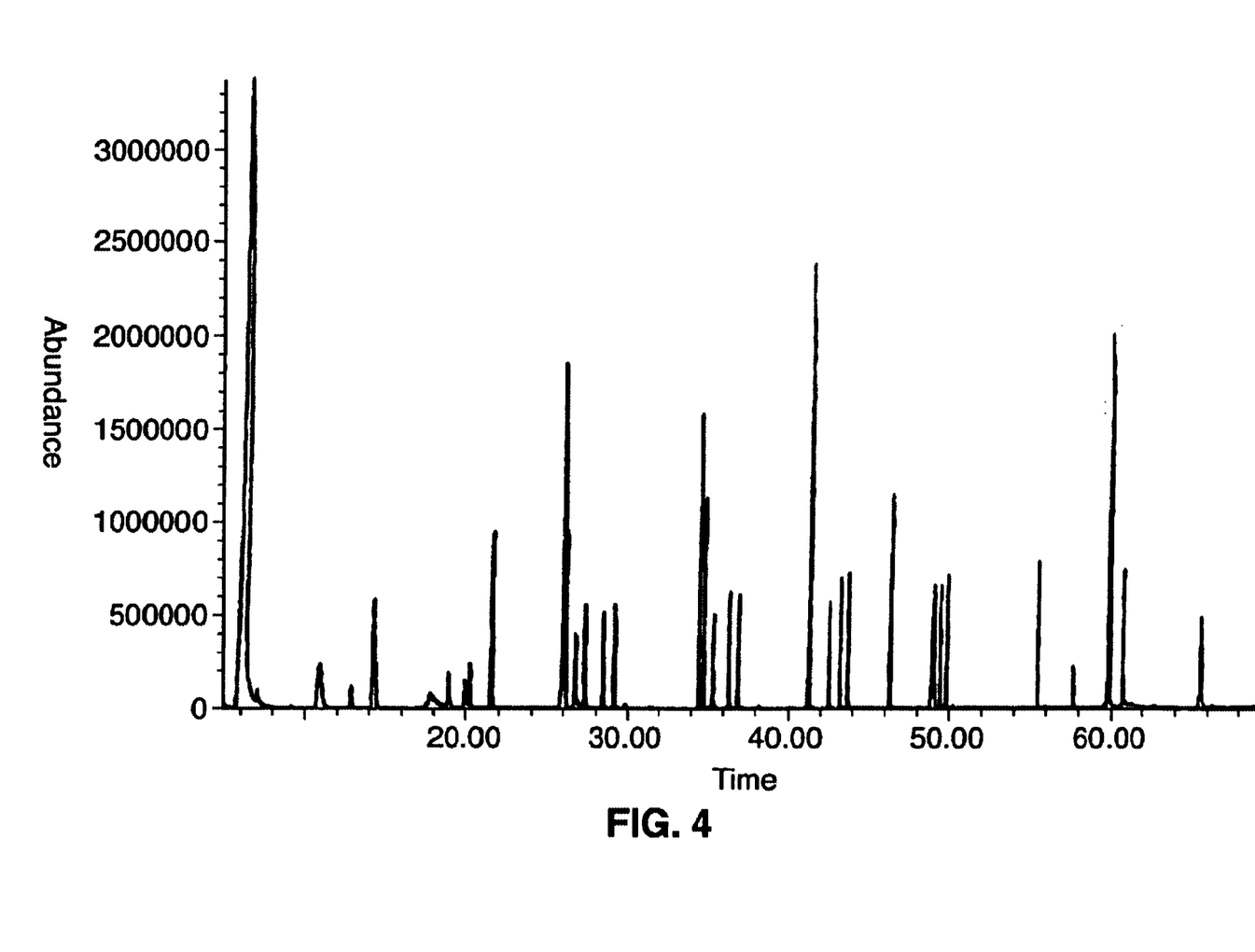
FIG. 4 is a total ion chromatogram of a set of volatile and semivolatile hydrocarbons listed in Table 1, thermally desorbed from a methylated sol-gel trap and analyzed by gas chromatography-mass spectrometry (electron impact).

FIG. 4 is a total ion chromatogram of a set of volatile and semivolatile hydrocarbons listed in Table 1, thermally desorbed from a methylated sol-gel trap and analyzed by gas chromatography-mass spectrometry (electron impact). The recovery of the analytes from the trap charged with a single methylated sol-gel sorbent compares favorably with the analyte recovery from a trap of the same proportions charged with three leading brand commercial sorbents (see Table 1 for a numerical comparison). The first peak is residual methanol from sorbent preparation which was removed by further conditioning.

Table 1 is a comparison of sol-gel derived sorbent performance with carbon triple sorbent trap loaded with three leading brands of carbon sorbents having differing adsorptive properties. The table entries reflect the analyte recovery from the sol-gel trap as a percentage of the amount of analyte recovered from the carbon triple sorbent trap. The sol-gel trap used for the comparison study was conditioned by purging at 350° C. under a 100 ml/min helium gas flow.

TABLE 1

| Compound | After Extended Conditioning | Before Extended Conditioning |
| --- | --- | --- |
| Benzene-D6 | 100 | 100 |
| Acetonitrile | 87 | 94 |
| Acetone | 90 | 94 |
| Vinylidine chloride | 60 | 39 |
| Methylene chloride | 82 | 68 |
| Propane nitrile | 72 | 82 |
| Butanol | 102 | 111 |
| Hexane | 75 | 78 |
| Hexafluorobenzene | 95 | 113 |
| Benzene | 94 | 97 |
| 1-Butanol | 98 | 98 |
| Butane nitrile | 98 | 102 |
| 2-Pentanone | 100 | 101 |
| Heptane | 88 | 92 |
| Ethylbenzene-D10 | 100 | 100 |
| Toluene-D8 | 95 | 100 |
| Toluene | 93 | 98 |
| Pentane nitrile | 96 | 101 |
| 2-Hexanone | 104 | 101 |
| Octane | 86 | 100 |
| Hexane nitrile | 107 | 105 |
| 2-Heptanone | 129 | 102 |
| Nonane | 95 | 99 |
| Bromobenzene-D5 | 105 | 100 |
| Heptane nitrile | 105 | 96 |
| 2-Octanone | 97 | 97 |
| Dodecane-D26 | 100 | 100 |
| Decane | 120 | 110 |
| Undecane | 119 | 108 |
| Dodecane | 119 | 106 |
| Tridecane | 165 | 137 |

Another embodiment of the present invention is a method for the analysis of organic explosives by thermal desorption from sorption tubes filled with a copolymerized sol-gel (SG) derived sorbent made by the process of EXAMPLE 1. Explosives analysis is done by gas chromatography with negative ion chemical ionization mass spectrometric detection, GC/MS(NICI). GC/MS(NICI) has previously been shown to exhibit nanogram sensitivity levels for explosives when scanning a range of ions. It has also been shown in the literature that picogram detection levels could be obtained with selected ion monitoring. Ion scanning techniques are employed in the present invention. The advantage of scanning a range of ions is that it allows for the identification of a suite of explosives without a-priori knowledge of the sample composition. Thermal desorption is conducted in the injection port of a gas chromatograph. The method of the present invention is validated for a set of 15 analytes comprised of nitroesters, nitramines and nitroaromatics.

Instrumentation: A Hewlett-Packard 5989A Gas Chromatograph/Mass Spectrometer with dual ionization source was used for analysis. The instrument was equipped with a HT-5 column (5% phenyl polycarborane siloxane, 0.22 mm i.d., 12 m in length, 0.1 μm film thickness, Scientific Gas Engineering, Inc., Austin, Texas). The analysis was performed in electron capture negative ion chemical ionization (NICI) mode. The source pressure was optimized at 1.2 Torr for maximum sensitivity employing methane as the reagent gas. The instrument was tuned using the manufacturer's procedure. Source temperature was set at 150° C., and the quadrapole temperature at 100° C. With the electron energy set at 230 eV and emission current at 300 $\mu$A, full scan (50–550 amu) spectral data were acquired at a scan rate of 0.8 scan/sec. To check the instrument performance, 320 pg of decachlorobiphenyl and 92 pg of hexachlorobenzene were injected and analyzed with a column temperature program as follows: 100° C. held for 3 min., raised to 280° C. at 20° C. min$^{-1}$. The resulting spectra were then compared with reference spectra: for decachlorobiphenyl m/z 498 (100%), 464 (>27%), and 430 (>5%); for hexachlorobenzene m/z 284 (100%), 286 (>70%), 250 (>10%). If the ion relative abundances were out of range, the instrument was retuned. In addition, the GC peak heights for both compounds acquired over the full scan mass range were required to be at least three times greater than the noise.

The gas chromatograph was modified by attaching an on/off valve to the split-vent on the front of the instrument. The flow rate of carrier gas (helium) was held at 1.00 mL min$^{-1}$ throughout the GC run by an electronic pressure controller with vacuum compensation. The split vent flow was adjusted to about 30 mL min$^{-1}$ in order to obtain a flow rate of 13.1 mL min$^{-1}$ during thermal desorption process, when the split-vent was closed. Two column oven temperature programs were employed, as described in EXAMPLE 4.

Reagents: All explosives and explosives-related compounds were used as received. Diethyleneglycol dinitrate (DEGN [602-38-0]) was obtained from Trojan Corporation (Spanish Fork, Utah).; 2,6-Dinitrotoluene (2,6-DNT [606-20-2]), 2,4-dinitrotoluene (2,4-DNT [121-14-2]), 2,3-dinitrotoluene (2,3-DNT [602-01-7]), 3,4-dinitrotoluene (3,4-DNT [610-39-9]), 1,8-dinitronaphthalene (DNN [602-38-0]), 4-amino-2,6-dinitrotoluene (4-A-2,6-DNT [1946-51-0]), and 2-amino4,6-dinitrotoluene (2-A-4,6-DNT [35572-78-2]) were purchased from Aldrich Chemical Co. (Milwaukee, Wis.). 2,5-Dinitrotoluene (2,5-DNT [619-15-8]) and benzene were obtained from Fisher Scientific Co. (Pittsburgh, Pa.). 2,4,6-Trinitrotoluene (TNT [118-96-7]) and hexahydro-1,3,5-trinitro-1,3,5-triazine (RDX [121-824]) were supplied by the Naval Explosive Ordnance Disposal Technical Division at the Naval Surface Warfare Center (Indian Head, Md.). Pentaerythritol tetranitrate (PETN [78-11-5]) was obtained from the US Army Standard Analytical Reference Material repository, US Army Environmental Center (Aberdeen Proving Ground, Md.). Stock solutions (1 mg mL$^{-1}$ in acetonitrile) of 1,3-dinitrobenzene (1,3-DNB [99-65-0], 1,3,5-trinitrobenzene (1,3,5-TNB [99-354]), trinitroglycerin (NG [55-63-0]) and methyl-2,4,6-trinitrophenylnitramine (tetryl [47945-8]) were obtained from Radian International LLC (Austin, Tex.). Acetonitrile was obtained from EM Science (Gibbstown, N.J.). Stock solutions containing DEGN (0.85 mg mL$^{-1}$), NG (1.00 mg mL$^{-1}$), 2,6-DNT (9.00 mg mL$^{-1}$), 1,3-DNB (1.00 mg mL$^{-1}$), 2,5-DNT (3.00 mg mL$^{-1}$), 2,4-DNT (4.50 mg mL$^{-1}$), 2,3-DNT (8.30 mg mL$^{-1}$), 3,4-DNT (7.70 mg mL$^{-1}$), TNT (8.90 mg mL$^{-1}$), 1,3,5-TNB (1.00 mg mL$^{-1}$), PETN (3.00 mg mL$^{-1}$), 4-A-2,6-DNT (2.70 mg mL$^{-1}$), RDX (4.80 mg mL$^{-1}$), 2-A-4,6-DNT (2.50 mg mL$^{-1}$), tetryl (1.00 mg mL$^{-1}$), and 1,8-DNN (5.00 mg mL$^{-1}$) were prepared in either acetonitrile or benzene. The stock solutions were used to prepare mixtures of known concentrations in benzene for method development.

EXAMPLE 4

Sorbent trap preparation: The sol-gel sorbent used in the present invention was prepared by the method in EXAMPLE 1, the co-polymerization of tetramethylorthosilicate and methyltrimethoxysilane. Sol-gel sorbent traps were prepared in a batch of 10 by loading approximately 70 mg per trap of SG sorbent material into stainless steel tubes (6 mm o.d., 76 mm×4 mm i.d.). SG traps were conditioned at 400° C. overnight at a flow rate of 50 to 100 mL min$^{-1}$ helium (high purity 99.9999%) per trap. Helium was flowing in the thermal desorption direction.

Explosive vapor sample collection: Dynamic sample collection of the headspace over a smokeless powder was performed in order to demonstrate the validated methodology for the quantitation of explosive components collected by vapor sampling. The arrangement for sample collection involved loading a 4 cm length of 6 mm OD U-shaped glass tubing with Scot Solo 1251 smokeless powder (Scot Powder Co.). The tube was placed in an open top metal container which was, in turn, packed with sand. Cartridge heaters were placed inside the sand bed to warm the enclosure to a controlled temperature (near 40° C.). The entire assembly was placed in a 2.5 cm thick explosion retarding cast acrylic plastic enclosure for safety purposes. The carrier gas (helium) was, flowing through the bed of powder at ca. 200 mL min$^{-1}$. The total collection volume of carrier gas passed through the bed of smokeless powder was 21.0 L. Experiments were conducted at temperature of 40° C. The SG traps were analyzed by TD/GC/MS(NICI) as described above in Instrumentation.

Method Validation Procedure: The following procedure was performed to validate the methodology for analyzing trace explosive vapor collected and concentrated on the SG sorbent traps. In order to establish a calibration curve for TD/GC/MS(NICI), SG traps were spiked in triplicate with calibration standards that included internal standard and 15 explosives (see above) at six concentrations ranging from 0.5 to 150 ng/trap. After spiking the SG trap with 2 $\mu$l sample of calibration solution, the trap was fitted with a Viton O-ring (6.3 mm ID) at the upstream end (opposite to the sampling direction) of the trap. All trap handling was performed while wearing cotton gloves to prevent transfer of skin oils and other contaminants to the outside of the trap. In a typical calibration analysis, the injection port temperature was reduced to less than 50° C. to allow the SG trap to be placed into the injection port without loss of volatile components. The trap was placed inside the injection port and the port was then closed and heated to 170° C. with the split purge turned off. The exit port was blocked by closing the on/off valve. The helium flow during thermal desorption increased to 13.1 mL min$^{-1}$, forcing analytes onto the analytical column. Thermal desorption was allowed to proceed for 7 min., including the 3.5–4 min injector heating time. The gas chromatograph oven was held at ambient temperature during thermal desorption to allow the analytes to condense and focus at the head of the column. The oven temperature program was initiated immediately after the split vent was turned to the "on" position, and the carrier flow rate was reduced to 1 mL min$^{-1}$. The column oven temperature was programmed linearly from 70° C. (hold 5 min) to 185° C. at 7° C. min$^{-1}$ and then to 280° C. (hold for 10 min) at 20° C. min$^{-1}$.

Prior to TD/GC/MS(NICI) analysis of trace explosives collected from smokeless powder on the sample traps, a 2 $\mu$l sample of internal standard solution (1,8-dinitronaphthalene at concentration of 50 ng/$\mu$l) was spiked onto the sample trap in the sampling direction. The sample traps were thermally desorbed in the injection port, followed by GC/MS(NICI) analysis using the procedure described above. However, a slightly faster GC oven program was employed. The column oven temperature was programmed linearly from 70° C. (hold 5 min) to 185° C. at 10° C. min$^{-1}$ and then to 280° C. (hold for 10 min) at 30° C. min$^{-1}$. The integrated area of a selected ion was obtained for each component for data analysis (m/z 62 for DEGN and NG, m/z 182 for all DNT isomers, m/z 168 for 1,3-DNB, m/z 227 for TNT, m/z 213 for TBN, m/z 62 for PETN, m/z 102 for RDX, m/z 197 for 4-A-2,6-DNT and 2-A-4,6-DNT, m/z 242 for tetryl, and m/z 218 for 1,8-DNN).

Figure 5:
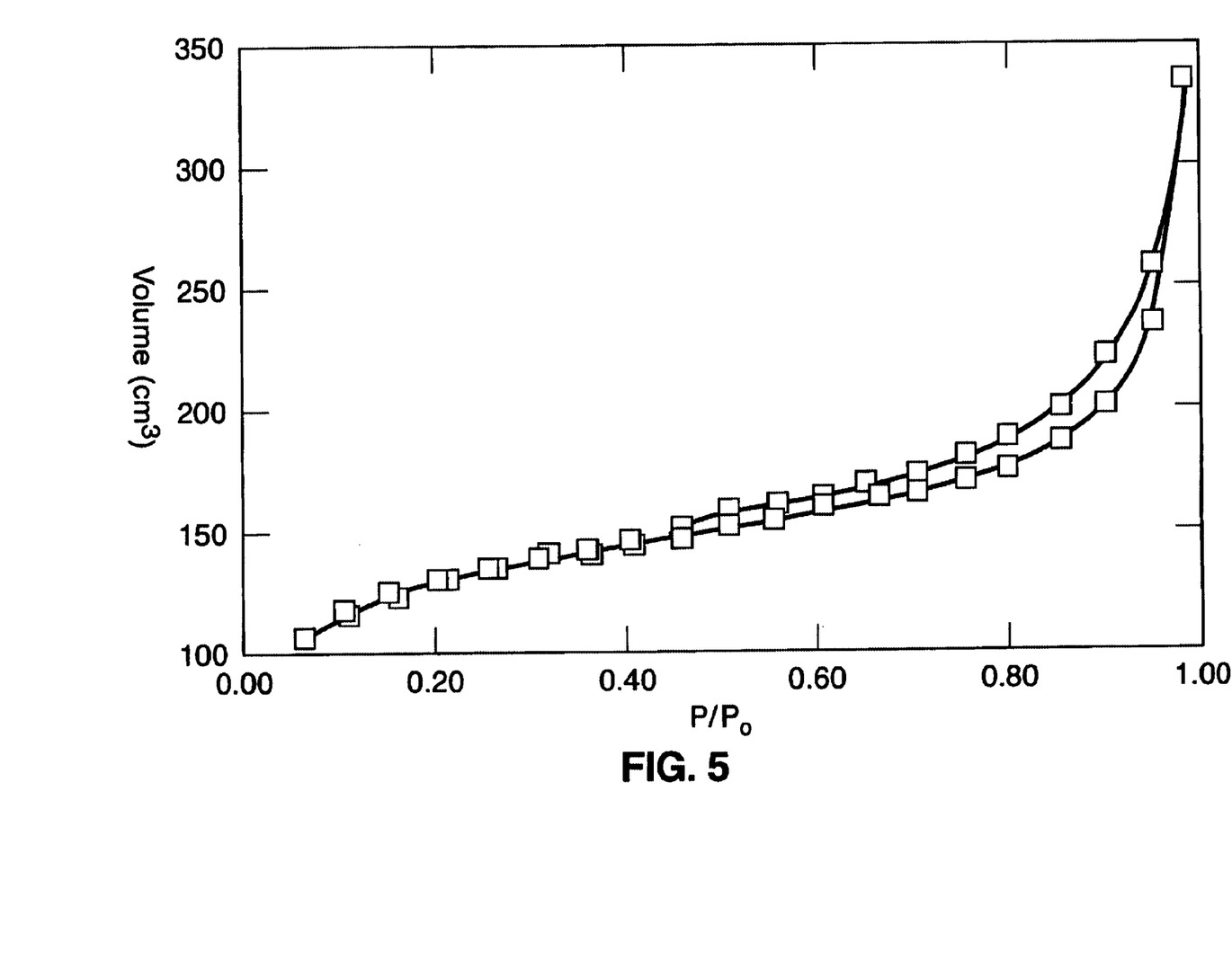
FIG. 5 shows type II nitrogen adsorption (bottom curve) and desorption (top curve) isotherms measured for the copolymerized SG sorbent.
Figure 6:
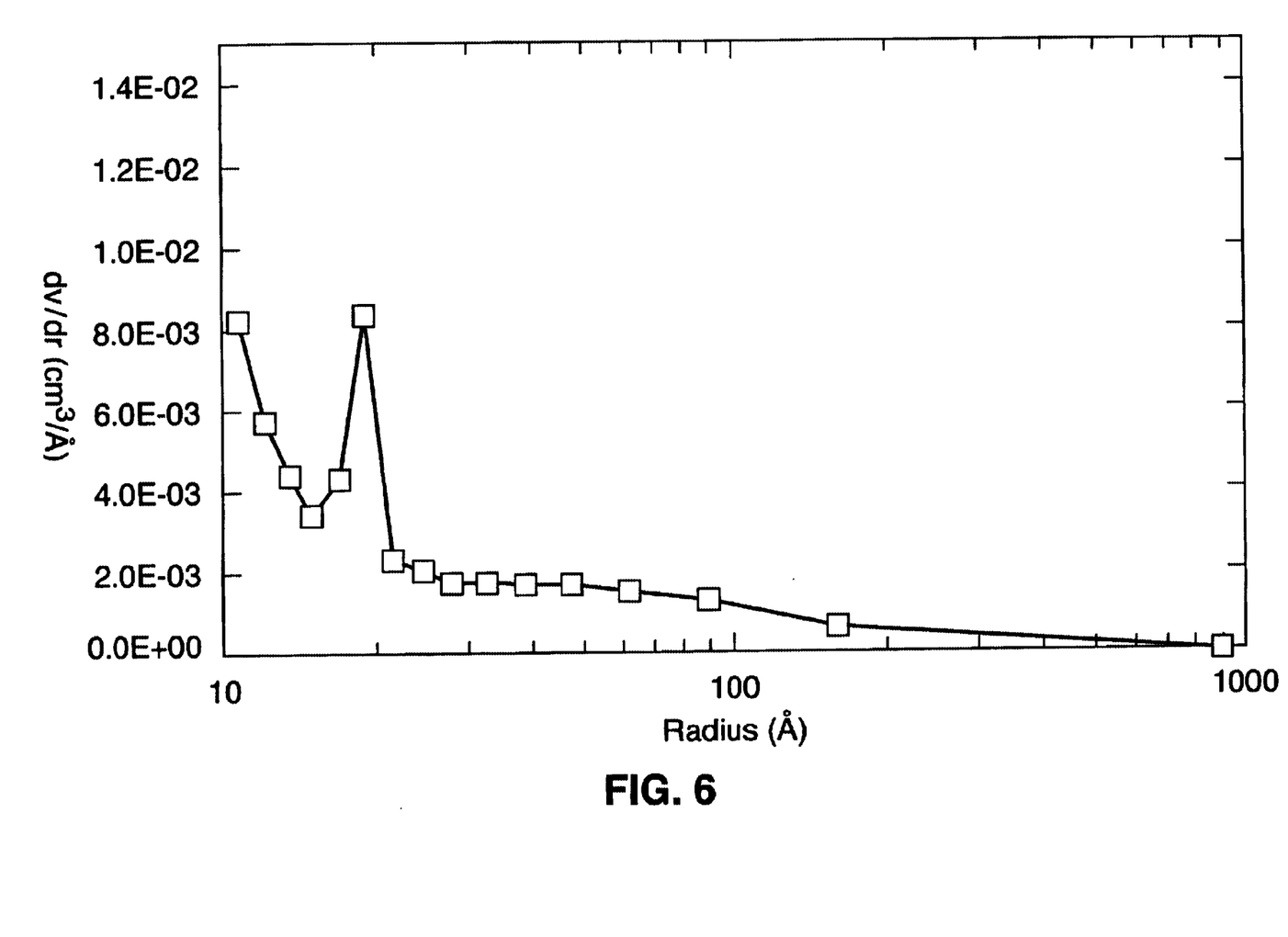
FIG. 6 shows pore size distribution determined from the desorption curve in FIG. 1; micropores with radii of less than 10 Å, a set of 17 Å radius pores and a lesser amount of mesopores with broadly distributed radii ranging from 20–150 Å are present.
Figure 7:
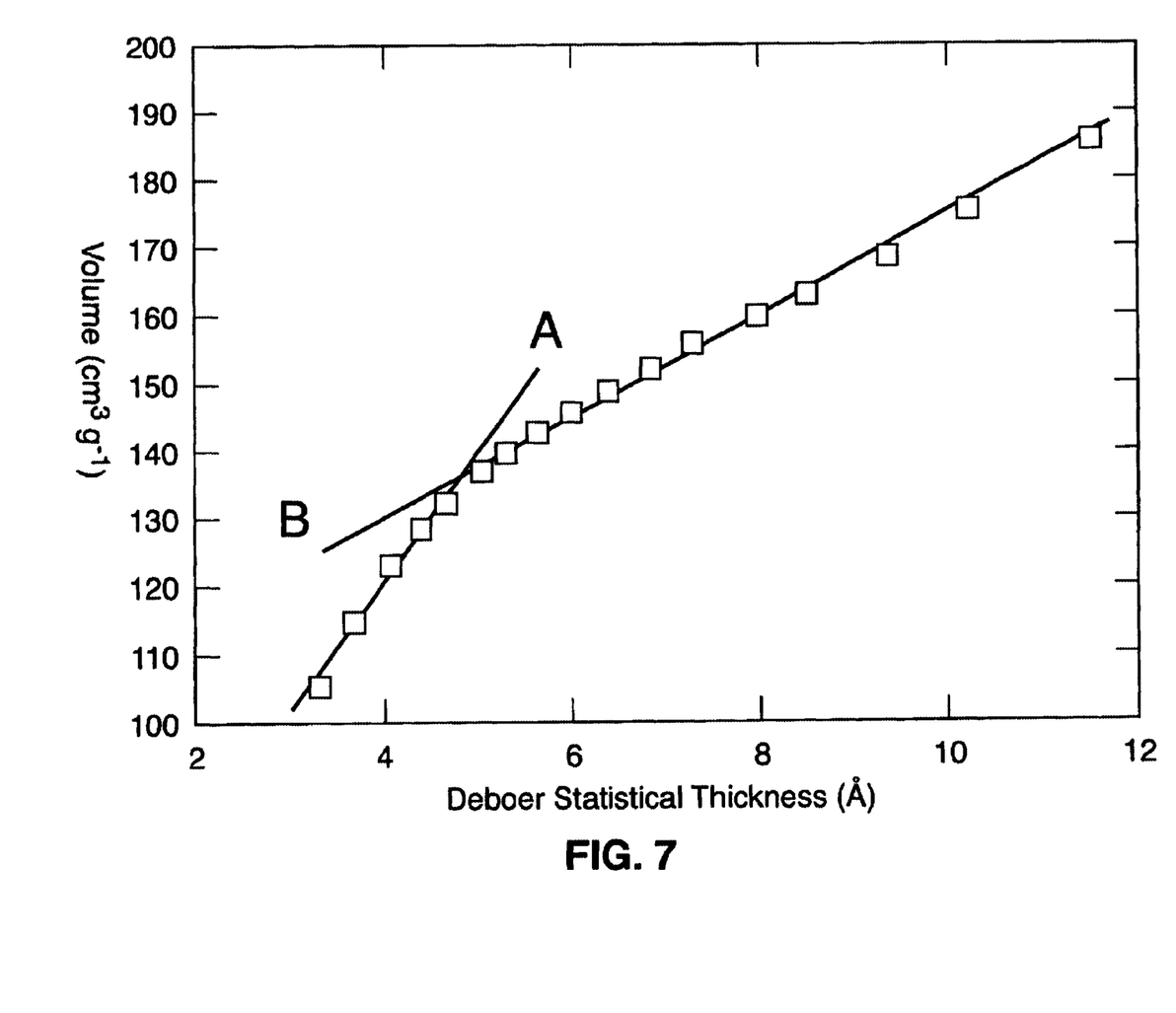
FIG. 7 is a Deboer V-t plot for nitrogen adsorption on copolymerized SG sorbent; linear region A gives an estimate of the total pore surface area and the intersection of lines A and B estimates the radii of micropores in the sorbent.

Sorbent Characterization: The sorbent, SG, had a $N_2$-BET surface area of 406 $m^2g^{-1}$ and exhibited a Type II isotherm, as shown in FIG. 5. Type II isotherms are common for $N_2$ adsorption on powdered samples and reflect physical adsorption with multilayer formation. The hysteresis observed on the desorption curve (top curve in FIG. 5) is of the form generally associated with cylindrical or capillary shaped pores. The pore size distribution (FIG. 6), determined from the desorption curve, reveals a set of micropores with radii of less than 10 Å, a set of 17 Å radius: pores (borderline micro-mesopores), and a lesser amount of true mesopores with broadly distributed radii ranging from 20–150 Å. Further analysis of the sorbent micropores is obtained from the V-t plot in FIG. 7. The two linear regions of the plot indicate the presence of micropores having a radius greater than 3.5 Å. From the slope of line A in FIG. 7, an estimated total pore area of 304 $m^2g^{-1}$ is obtained. The difference between the $N_2$-BET surface area and the total pore area gives an estimated micropore surface area of 102 $M^2g^{-1}$. The intersection of curves A and B in FIG. 7 gives an estimate of the micropore radius as slightly less than 5 Å.

Reproducibility of Sorbent Tube Preparation: Three sorption tubes were randomly selected from the batch of ten tubes, described above, and tested. Each tube to be tested was spiked with an analyte mixture and thermally desorbed. Recoveries were determined by GC/MS(NICI). The analysis was repeated in triplicate for each tube and the average analyte recovery was determined for each tube. The average analyte recoveries were used to determine the % RSD for the three tube set. The results, listed in Table 2, show that the average analyte recoveries from the three tubes have % RSD that ranges from 1% for TNB up to 28% for NG. The low % RSD values suggest good tube-to-tube reproducibility. The data in Table 2 reveals that the % RSD is generally greater for the more volatile analytes. To further test the tube-to-tube reproducibility, an assessment was made of the normality of the data for explosives recoveries from the three tubes. The standardized recoveries ($Z_{i,j}$) were determined for the explosives recovery (j=1 to 15) from each of the tubes (j=1 to 3), as given by Eq. 1.

$$Z_{i,j}=(Y_{i,j}-\overline{Y}_j)/s_j \quad j=1\ldots 3 \quad i=1,2\ldots 15 \quad (1)$$

Figure 8:
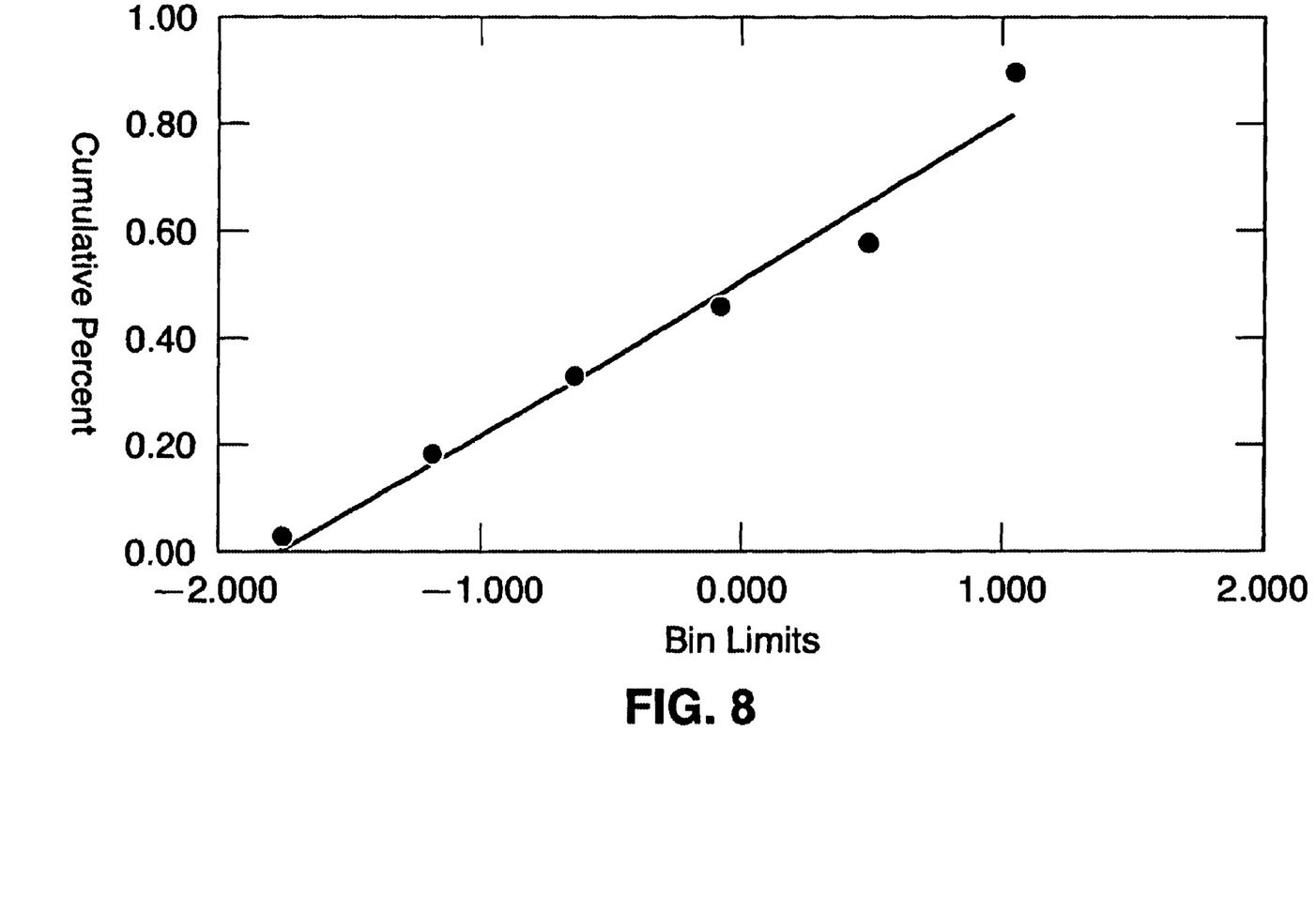
FIG. 8 is a normal probability plot of standardized recoveries from three copolymerized SG sorbent tubes; plot linearity (r=0.987) demonstrates that analyte recoveries from each tube are normally distributed and lie within the same normal distribution.

In Eq. 1, $\overline{Y}_j$ and $s_j$ are respectively the arithmetic mean and standard deviation of the jth set of observations. The cumulative frequency distribution of the Z values was determined and a normal probability plot is shown in FIG. 8. The linearity of the plot in FIG. 8 (r=0.987) confirms that the recoveries on each tube are normally distributed about the arithmetic mean and that all of the normalized recoveries lie within the same normal distribution. This result further substantiates tube-to-tube reproducibility and suggest an alternative, analyte specific, source of the larger observed % RSD for the more volatile analytes.

TABLE 2

Average in-injection port thermal desorption recoveries for explosives of three randomly selected sol-gel (SG-3) sorbent tubes.

|  | Average Recovery (ng) | % RSD |
|---|---|---|
| DEGN | 158.46 | 22.20 |
| NG | 69.99 | 27.91 |
| 2,6-DNT | 145.74 | 18.10 |
| 1,3-DNB | 145.51 | 23.13 |
| 2,5-DNT | 138.14 | 15.95 |
| 2,4-DNT | 133.13 | 9.58 |
| 2,3-DNT | 128.26 | 9.27 |
| 3,4-DNT | 122.78 | 13.36 |
| TNT | 68.28 | 9.36 |
| TNB | 102.63 | 1.20 |
| PETN | 119.89 | 7.01 |
| 4-A-2,6-DNT | 92.38 | 6.08 |
| RDX | 51.45 | 3.40 |
| 2-A-4,6-DNT | 81.11 | 3.12 |
| TETRYL | 58.15 | 4.06 |

Thermal Desorption Efficiency: Because all the explosive standards used for the method validation have fairly, low vapor pressures and an inherent thermal instability, each explosive standards mix was prepared as a solution in benzene and then spiked onto SG traps using a validated method as previously discussed. The trap was attached to the base of a pre-heated (170° C.) injection port with the split vent closed. A two microliter sample of the standard solution was injected, through a glass injector liner and purged with 200 mL of helium carrier gas (2 min at 100 mL min$^{-1}$) to ensure all the analytes were concentrated on the upstream end of the trap. A solvent delay at the beginning of each analysis allowed residual benzene to pass through the mass spectrometer. Traces of benzene contribute to the background when this method is run with electron impact (EI) detection; however, the residual benzene does not interfere with NICI detection. For each explosive in the standard solution, the desorption efficiency (measured, as % recovery) was calculated relative to recovery from a liquid injection. The integrated area for a selected ion generated from thermal desorption was compared with the integrated area for the same ion generated from direct injection of the same standard solution followed by GC/MS(NICI) analysis. The comparison provides a measure of the accuracy of the methodology. The values reported in Table 3 are the result of at least three successive sets of thermal desorptions and liquid injections at the analyte levels of approximately 30 ng per component. Desorption efficiency for analytes ranged from 44% to 177%. It was observed that explosives with more than three polar functional groups on the molecule such as NG, TNT, RDX, 4-A-2,6-DNT, 2-A-4,6-DNT, and tetryl seemed to exhibit lower desorption efficiencies. The higher than 100% recovery rates for DEGN and DNT isomers are due to decomposition and loss of analytes through the split/splitless vent during a liquid injection. During the injection operation, although the injector was set in "splitless" mode for 2 minutes, and a fraction of analytes with low boiling points, such as DEGN and DNT isomers, may possibly have vented through the split vent, thus, resulting in lower NICI responses for those analytes. Therefore, the resulting desorption efficiencies for those analytes would be artificially higher than 100%. In a separate experiment, a SG trap was connected to the split vent and collected the effluent from the injection port during the liquid injection process. The trap was then analyzed by TD/GC/MS(NICI). Trace amount of DEGN and DNT isomers were detected in the effluent. This finding further confirmed that low boiling components indeed have a tendency to escape through the split vent from the heated injection port, even with the purge valve set in the "off" mode for two minutes during the initial injection process. The average recovery for 1,8-DNN, the internal standard used, was 88.73% with a relative standard deviation of 6.73%.

Precision: SG traps were spiked in triplicate with explosive standard solution that included 15 target analytes at six concentrations ranging from 0.5 to 154 ng/trap and internal standard (IS) at 85 ng/trap. The SG traps were spiked at a given concentration and analyzed by TD/GC/MS(NICI) in random order over a period of two weeks. The integrated area of a selected ion from each analyte and from IS were used to calculate the area ratio. Table 3 summarized the percent standard deviation (% RSD) of the area ratios that were observed at the six concentrations. The observed ranges in % RSD served as a measure of the precision of the method. The majority of % RSDs for the entire procedure, including trap spiking and thermal desorption, are less than 30% for the SG traps spiked at concentration greater than 0.5 ng/trap. As expected, the precision decreases as the concentrations of target analytes approach the limit of detection.

Linearity and Range: The linearity of the method was determined from the same data used for the precision determination. The ratios of the integrated area for each analyte relative to the integrated area for the internal standard were averaged (Y). The average area ratios were plotted against the analyte to internal standard concentration ratios (X). The plots were linear for some analytes and decidedly nonlinear for others. The nonlinear plots were all concave to the concentration ratio (X) axis. The curvature of the plots indicates a decreasing recovery for the analyte at higher concentrations. The DNT isomers and DEGN gave Table 3 along with the fitted A and B parameters. The models accounted for greater than 88.0 percent of the variance in all cases and greater than 95 percent in most cases.

Limit of Detection: Determination of the method limit of detection (LOD) for each analyte was based on data used for the precision and linearity. The method LODs, given in Table 3, follow the definition of the lowest analyte concentration in a sample that can be quantified. Two definitions of limit of detection for each analyte were adopted for the determination of LODs. As listed in Table 3, the first LODs were defined as equal to three times of standard deviation of the intercept obtained from the regression analysis. The second LODs were defined as three times of standard deviation of regression residuals. The values in Table 3 represent validated limits of detection for the thermal desorption method. In general, the LODs based on the first definition (0.23 to 16.05 ng) are lower than those based on the second definition (1.42 to 39.31 ng). Because of the thermal instability, PETN, RDX, and tetryl exhibited the highest LODs.

Figure 9:
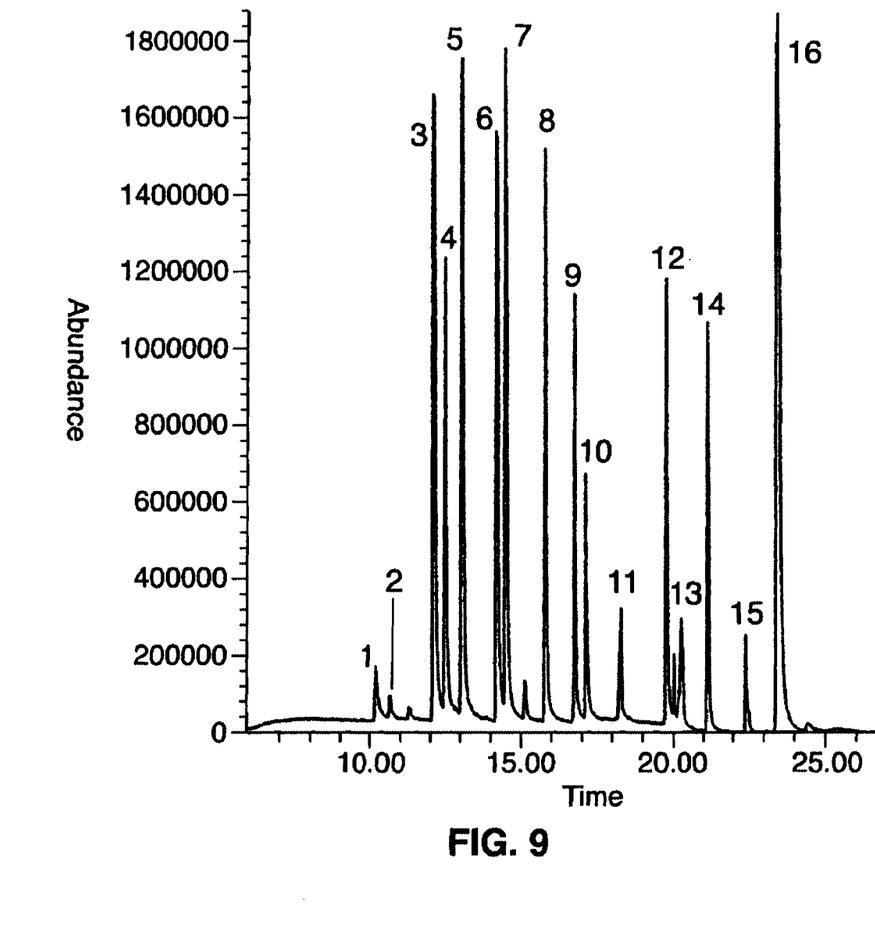
FIG. 9 shows an in-injection port thermal desorption GC/MS(NICI) chromatogram of a standard mix of explosives.

Specificity: The ability to measure explosives-related analytes accurately and specifically in the presence of other components was not rigorously determined for the method using NICI detection. However, the peak broadening and tailing from thermal desorption is not significant, as shown for a GC/MS(NICI) chromatogram in FIG. 9. The analytes (quantity given in parenthesis) elute in the following order, starting at 10 min: DEGN (13.7 ng), NG (16.1 ng), 2,6-DNT (14.5 ng), 1,3-DNB (16.1 ng), 2,5-DNT (14.5 ng), 2,4-DNT (21.7 ng), 2,3-DNT (13.4 ng), 3,4-DNT (12.4 ng), TNT (14.3 ng), 1,3,5-TNB (16.1 ng), PETN (48.3 ng), 4-A-2,6-DNT (17.4 ng), RDX (77.3 ng), 2-A-4,6-DNT (16.0 ng), tetryl (16.1 ng), and 1,8-DNN (IS, 85.0 ng).

TABLE 2

Validation data for the in-injection port thermal desorption and analysis of explosive vapor by GC/MS(NICI)

| Analyte | Accuracy (Desorp. Efficncy.) | Reproducibility (% RSD) | Regression Coefficients | | | | $LOD^a$ (ng) | $LOD^b$ (ng) | Calibration Range (ng) |
|---|---|---|---|---|---|---|---|---|---|
| | | | $AX^{1/2}$ | AX | B | $R^2$ | | | |
| DEGN | 177.13 | 5.45–16.07 | 0.1625 | | −0.0149 | 0.9851 | 1.22 | 2.03 | 0.55–27.36 |
| NG | 76.29 | 23.03–30.93 | | 0.0856 | 0.0003 | 0.9851 | 4.10 | 13.40 | 0.65–32.19 |
| 2,6-DNT | 155.05 | 2.47–16.98 | 1.6844 | | 0.0360 | 0.9128 | 0.23 | 1.70 | 0.58–28.97 |
| 1,3-DNB | 163.76 | 4.65–26.28 | | 1.1988 | 0.0085 | 0.9792 | 0.97 | 4.26 | 0.65–32.19 |
| 2,5-DNT | 144.38 | 1.70–14.46 | 1.8543 | | −0.0504 | 0.9635 | 0.46 | 1.43 | 0.58–28.97 |
| 2,4-DNT | 131.52 | 1.93–25.48 | 1.0909 | | −0.0867 | 0.9877 | 1.07 | 1.95 | 0.88–43.46 |
| 2,3-DNT | 124.74 | 2.02–13.04 | 1.4869 | | 0.0013 | 0.9308 | 0.32 | 1.59 | 0.54–26.72 |
| 3,4-DNT | 125.75 | 4.47–18.46 | 1.3633 | | −0.1146 | 0.9846 | 1.06 | 1.79 | 0.50–24.79 |
| TNT | 65.07 | 7.05–36.99 | | 0.6274 | −0.0041 | 0.8802 | 4.10 | 10.50 | 0.58–28.65 |
| 1,3,5-TNB | 91.35 | 12.50–22.42 | | 0.3447 | −0.0093 | 0.9508 | 4.74 | 9.89 | 0.65–32.19 |
| PETN | 99.01 | 10.30–28.79 | | 0.0991 | −0.0043 | 0.9735 | 9.07 | 19.91 | 1.95–96.57 |
| 4A26-DNT | 76.48 | 4.19–34.23 | 1.2615 | | −0.0253 | 0.9636 | 3.97 | 8.32 | 0.70–34.77 |
| RDX | 44.00 | 9.69–29.58 | | 0.0381 | −0.0014 | 0.9413 | 16.05 | 39.31 | 3.12–154.52 |
| 2A46-DNT | 71.18 | 1.05–22.45 | | 1.1599 | −0.0308 | 0.9604 | 4.45 | 8.75 | 0.65–32.19 |
| TETRYL | 49.57 | 18.35–25.03 | | 0.1638 | −0.0056 | 0.9123 | 6.23 | 11.79 | 0.65–32.19 |

[a]Determined based on three times the standard deviation of the intercept from regression analysis.
[b]Determined based on three times the standard deviation of the regression residuals.

nonlinear plots with a quadratic dependence on the concentration ratio, while the plots for all other isomers were linear. No explanation is offered for this difference in observed behavior. The area and concentration ratios were used to obtain calibration curves by fitting the data to one of two models (either $Y=AX^{1/2}+B$, or $Y=AX+B$), and estimating the coefficients by regression analysis. The coefficients of determination ($R^2$) resulting from regressions are given in

EXAMPLE 5

Analysis of Smokeless Powder Headspace: A SG trap (made as described in EXAMPLE 1) was used to collect and concentrate vapor sample present in a vapor chamber that contained a bed of smokeless gunpowder. Carrier gas (helium) was constantly sweeping through the chamber at a flow rate of 200 mL min$^{-1}$. A total of 21.0 L of carrier gas was collected at the chamber temperature of 40° C. The sample trap was analyzed by TD/GC/MS(NICI).

Figure 10:
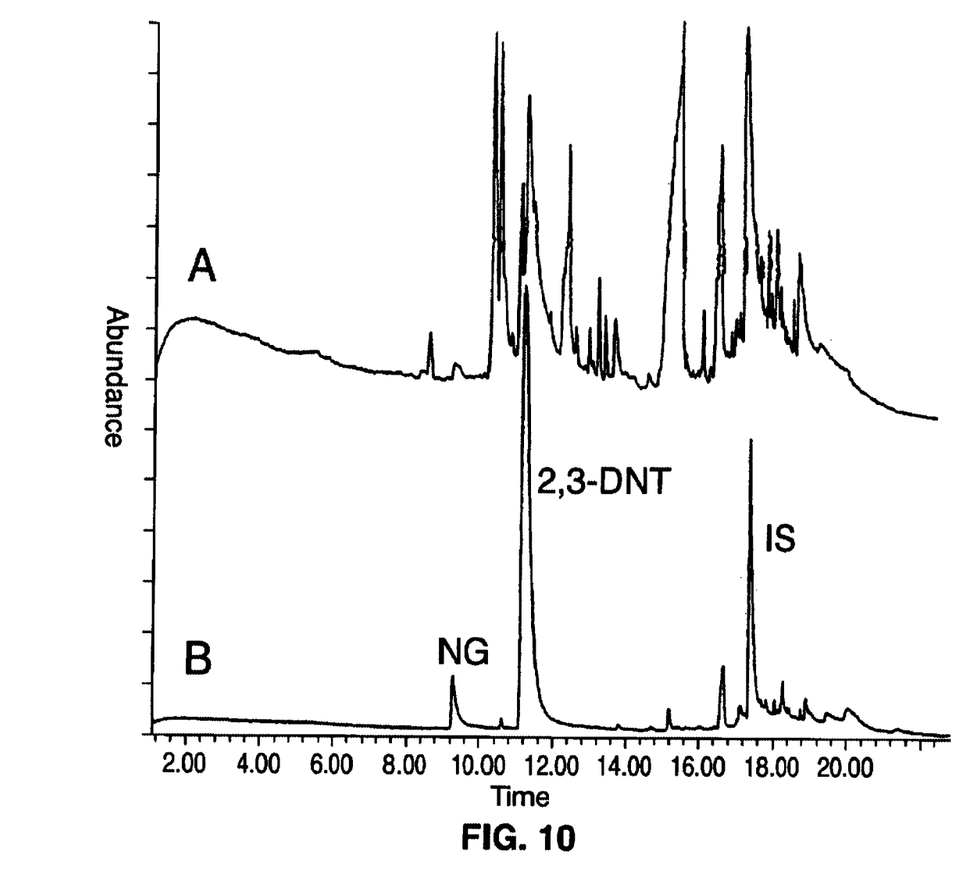
FIG. 10 shows an in-injection port thermal desorption GC/MS(NICI) chromatograms of explosive vapor from a smokeless gunpowder sample collected on a copolymerized SG trap (curve A) and a standard mix (curve B) containing NG (47.6 ng), 2,3-DNT (11.0 ng), and 1,8-DNN (IS, 10 ng) for identification of explosive vapor components present in curve A.

The resulting total ion chromatograph is shown in FIG. 10, curve A. this chromatogram demonstrates the complexity of a real sample and the necessity of mass spectral assisted peak identification. The components eluted at 9.4 and 11.3 min were identified as NG and 2,3-DNT respectively. The criteria of identification and quantitation were based on (1) a match of retention time (±0.2 min) for an unknown component with that obtained from an authentic standard (FIG. 10, curve B), (2) a match of NICI spectrum for an unknown component with that obtained from an authentic standard, i.e. for NG [m/z 62 (100%), 59 (15%), 58 (12%) and 57 (5%)] and for 2,3-DNT [m/z 182 (100%), 166 (2%), and 152 (5%)]. and (3) signal to noise ratio greater than 3 (S/N>3) for an unknown component.

The present invention's use of an in-injection port thermal desorption method for explosives analysis has been demonstrated and validated for a set of 15 analytes. The method has also been applied to the analysis of a headspace sample collected from a smokeless powder. This method of the present invention utilizes a copolymerized sol-gel derived solid sorbent. The sorbent gives a very low background, is reusable and performs well for the collection and thermal release of explosives and explosives-related compounds. The in-injection port thermal desorption method of the present invention is also applicable to commercial sorbent tubes.

While there has been shown and described what are at present considered the preferred embodiments of the invention, it will be obvious to those skilled in the art that various changes and modifications can be made therein, without departing from the scope of the invention defined by the appended claims.

What is claimed is:

1. A method for producing copolymerized sol-gel derived sorbent particles comprising the steps of:
   a) providing a homogeneous aqueous metal alkoxide mixture comprising at least two different metal alkoxides;
   b) adding a sufficient amount of a basic solution to said aqueous metal alkoxide mixture to hydrolyze said metal alkoxides, said mixture having a pH≦8;
   c) allowing the mixture of step b) to copolymerize at room temperature, forming a copolymerized metal alkoxide mixture for a pre-calculated period of time for said mixture to undergo an increase in viscosity per said pre-calculation so to obtain a desired pore size and surface area;
   d) heating a nonpolar solvent to a temperature sufficient enough for said copolymerized metal alkoxide mixture of step c) to form a solid upon addition to said heated nonpolar solvent, said nonpolar solvent being immiscible with said copolymerized metal alkoxide mixture;
   e) adding said copolymerized metal alkoxide mixture of step c) to said heated nonpolar solvent wherein said copolymerized metal alkoxide mixture forms a solid upon addition to said heated nonpolar solvent; and
   f) recovering said solid from said mixture of step e), said solid being a nonpolar copolymerized sol-gel derived sorbent.

2. The method of claim 1 wherein said metal alkoxides comprise metal selected from the group consisting of silicon, titanium, zirconium and barium.

3. The method of claim 1 wherein said metal alkoxides are tetraalkylorthosilicate and alkyltrialkoxysilane.

4. The method of claim 3 wherein said tetraalkylorthosilicate is tetramethylorthosilicate and said alkyltrialkoxysilane is methyltrimethoxysilane.

5. The method of claim 1 wherein said homogeneous aqueous metal alkoxide mixture comprises tetramethylorthosilicate and said methyltrimethoxysilane in a 1 to 3 ratio.

6. The method of claim 1 wherein said nonpolar solvent is benzene or cyclohexane.

7. The method of claim 1 wherein said method further comprises the step of heating said non-polar copolymerized sol-gel derived sorbent solid at a temperature, less than 600° C., for a time period sufficient enough to remove thermally-labile residue.

\* \* \* \* \*